United States Patent
Bichler et al.

(10) Patent No.: US 10,065,891 B2
(45) Date of Patent: Sep. 4, 2018

(54) POLYMER HAVING POLYETHER SIDE CHAINS

(71) Applicant: BASF SE, Ludwigshafen (DE)

(72) Inventors: Manfred Bichler, Engelsberg (DE); Martin Winklbauer, Halsbach (DE); Joachim Dengler, Tacherting (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 15/524,106

(22) PCT Filed: Nov. 3, 2015

(86) PCT No.: PCT/EP2015/075532
§ 371 (c)(1),
(2) Date: May 3, 2017

(87) PCT Pub. No.: WO2016/074984
PCT Pub. Date: May 19, 2016

(65) Prior Publication Data
US 2017/0320778 A1 Nov. 9, 2017

(30) Foreign Application Priority Data
Nov. 10, 2014 (EP) .................................... 14192482

(51) Int. Cl.
*C08F 20/06* (2006.01)
*C08F 20/26* (2006.01)
(Continued)

(52) U.S. Cl.
CPC ............ *C04B 28/02* (2013.01); *C04B 24/165* (2013.01); *C04B 24/246* (2013.01);
(Continued)

(58) Field of Classification Search
CPC ....... C04B 28/02; C04B 28/16; C04B 24/165; C04B 24/246; C04B 24/2647;
(Continued)

(56) References Cited

U.S. PATENT DOCUMENTS 4,725,665 A 2/1988 Pieh et al.
5,798,425 A 8/1998 Albrecht et al.
(Continued)

FOREIGN PATENT DOCUMENTS

DE 29 48 698 A1 6/1981
DE 35 30 258 A1 2/1987
(Continued)

OTHER PUBLICATIONS

International Search Report for PCT/EP2015/075532, dated Jan. 19, 2016.
(Continued)

*Primary Examiner* — William K Cheung
(74) *Attorney, Agent, or Firm* — Curatolo Sidoti Co., LPA; Joseph G. Curatolo; Salvatore A. Sidoti

(57) ABSTRACT

The invention relates to a polymer which is obtainable by copolymerizing monomers comprising at least one ethylenically unsaturated monomer which comprises at least one acid group and at least one ethylenically unsaturated monomer (II) having polyether groups with 5 to 35 repeating units and at least one ethylenically unsaturated monomer (III) having polyether groups with 45 to 150 repeating units, the molar ratio of monomer (II) to monomer (III) being between 75:25 and 99.5:0.5. Further disclosed are the use of the polymer of the invention as an admixture for inorganic binder compositions, and a composition in powder form comprising an inorganic binder and the polymer of the invention.

16 Claims, 1 Drawing Sheet

(51) Int. Cl.
*C04B 24/26* (2006.01)
*C08L 23/00* (2006.01)
*C04B 28/02* (2006.01)
*C04B 24/16* (2006.01)
*C04B 24/24* (2006.01)
*C04B 28/16* (2006.01)
*C08F 220/06* (2006.01)
*C04B 111/00* (2006.01)
*C04B 111/28* (2006.01)
*C04B 111/62* (2006.01)
*C04B 111/70* (2006.01)

(52) U.S. Cl.
CPC ...... *C04B 24/2647* (2013.01); *C04B 24/2658* (2013.01); *C04B 28/16* (2013.01); *C08F 220/06* (2013.01); *C04B 2111/00637* (2013.01); *C04B 2111/00672* (2013.01); *C04B 2111/28* (2013.01); *C04B 2111/62* (2013.01); *C04B 2111/70* (2013.01)

(58) Field of Classification Search
CPC ....... C04B 24/2658; C04B 2111/00637; C04B 2111/00672; C04B 2111/28; C04B 2111/62; C04B 2111/70; C08F 220/06
USPC ...................... 526/274, 317.1, 318.42; 524/5
See application file for complete search history.

(56) References Cited

U.S. PATENT DOCUMENTS

| | | | |
|---|---|---|---|
| 6,211,317 | B1 | 4/2001 | Albrecht et al. |
| 6,437,027 | B1* | 8/2002 | Isomura ................ C04B 24/165 524/5 |
| 6,573,316 | B1 | 6/2003 | Albrecht et al. |
| 6,620,879 | B1 | 9/2003 | Albrecht et al. |
| 6,946,510 | B2 | 9/2005 | Suau et al. |
| 2004/0019148 | A1 | 1/2004 | Suau et al. |
| 2014/0018486 | A1 | 1/2014 | Jacquemet et al. |

FOREIGN PATENT DOCUMENTS

| | | |
|---|---|---|
| DE | 195 13 126 A1 | 10/1996 |
| DE | 198 34 173 A1 | 2/1999 |
| DE | 199 05 488 A1 | 8/2000 |
| EP | 1 052 232 A1 | 11/2000 |
| FR | 2 993 278 A1 | 1/2014 |
| WO | WO 00/17263 | 3/2000 |
| WO | WO 01/96007 A1 | 12/2001 |

OTHER PUBLICATIONS

International Written Opinion for PCT/EP2015/075532, dated Jan. 19, 2016.
International Preliminary Report on Patentability for PCT/EP2015/075532, dated May 26, 2017.
Extended European Search Report for EP 14192482.9, dated Feb. 3, 2015 (4 pages).

* cited by examiner

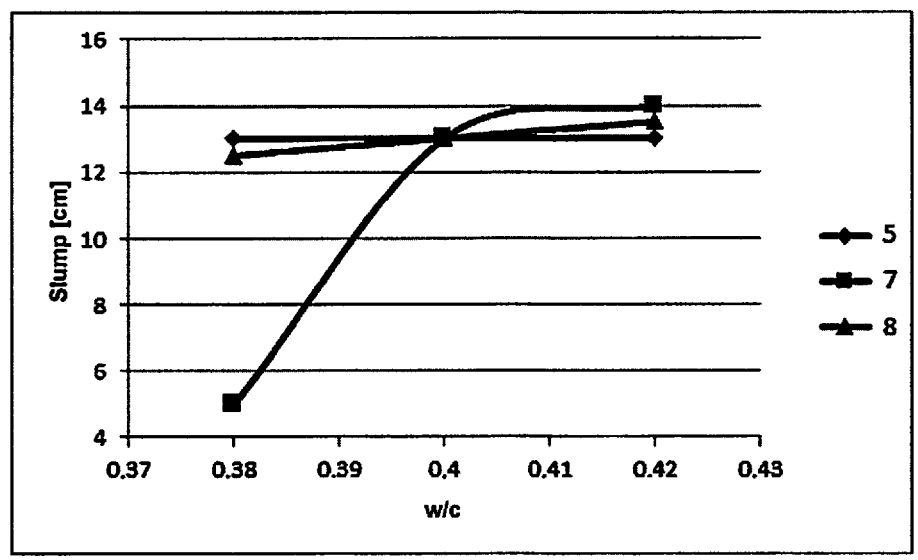

POLYMER HAVING POLYETHER SIDE CHAINS

CROSS REFERENCE TO RELATED APPLICATIONS

This application is a national stage application of International Application No. PCT/EP2015/075532, filed 3 Nov. 2015, which claims priority from European Patent Application No. 14192482.9, filed 10 Nov. 2014, which applications are incorporated herein by reference.

The invention relates to a polymer which is obtainable by copolymerizing monomers comprising at least one ethylenically unsaturated monomer which comprises at least one acid group and at least one ethylenically unsaturated monomer having polyether groups with 5 to 35 repeating units and at least one ethylenically unsaturated monomer having polyether groups with 45 to 150 repeating units. Further disclosed are the use of the polymer of the invention as an admixture for inorganic binder compositions, and a composition in powder form comprising an inorganic binder and the polymer of the invention.

To give inorganic suspensions of solids enhanced workability, i.e., kneadability, spreadability, sprayability, pumpability or flowability, they often have admixtures added to them, in the form of dispersants or plasticizers.

Inorganic solids of this kind in the construction industry usually comprise inorganic binders such as, for example, cement based on Portland cement (EN 197), cement having particular properties (DIN 1164), white cement, calcium aluminate cement (high-alumina or alum inous cement; EN 14647), calcium sulfoaluminate cement, specialty cements, calcium sulfate n-hydrate (n=0 to 2), lime or building lime (EN 459), and also pozzolans and latent hydraulic binders such as, for example, fly ash, metakaolin, silica dust, slag sand. Furthermore, the inorganic suspensions of solids generally comprise fillers, more particularly aggregates consisting of calcium carbonate, quartz, or other natural rocks in different particle sizes and particle morphologies, for example, and also further organic and/or inorganic additives (admixtures) for deliberate influencing of properties of chemical construction products, such as hydration kinetics, rheology or air content, for example. There may also be organic binders present such as latex powders, for example.

In order for building material mixtures, especially those based on inorganic binders, to be converted into a ready-to-use, workable form, it is generally necessary to use substantially more mixing water than would be required for the subsequent hydration or hardening process. The void fraction in the construction element, formed as a result of the excess water that subsequently evaporates, results in significantly impaired mechanical strength, stability, and durability of adhesion.

In order to reduce this excess water fraction for a given working consistency and/or in order to improve the workability for a given water/binder ratio, admixtures are used which within the construction chemicals segment are generally referred to as water reducers or plasticizers. Known such admixtures include, in particular, polycondensation products based on melamine-formaldehyde resins containing sulfonic acid groups and/or naphthalenesulfonic or alkylnaphthalenesulfonic acids.

DE 3530258 describes the use of water-soluble sodium napthalenesulfonic acid-formaldehyde condensates as admixtures for inorganic binders and building materials. These admixtures are described for improving the flowability of the binders such as cement, anhydrite or gypsum, for example, and also the building materials produced using them.

DE 2948698 describes hydraulic mortars for screeds that comprise plasticizers based on melamine-formaldehyde condensation products, and/or sulfonated formaldehyde-naphthalene condensates, and/or lignosulfonate, and comprising, as binders, Portland cement, clay-containing lime marl, clay clinkers, and soft-fired clinkers.

In addition to the purely anionic plasticizers, which comprise essentially carboxylic acid groups and sulfonic acid groups, a more recent group of plasticizers described comprises weakly anionic comb polymers, which typically carry anionic charges on the main chain and include nonionic polyalkylene oxide side chains.

WO 01/96007 describes these weakly anionic plasticizers and grinding assistants for aqueous mineral suspensions which are prepared by radical polymerization of monomers containing vinyl groups and which include polyalkylene oxide groups as a main component.

DE 19513126 and DE 19834173 describe copolymers based on unsaturated dicarboxylic acid derivatives and oxyalkylene glycol alkenyl ethers and the use thereof as admixtures for hydraulic binders, especially cement.

The aim of adding plasticizers in the construction industry is either to increase the plasticity of the binder system or to reduce the amount of water required under given working conditions.

It has emerged that plasticizers based on lignosulfonate, melaminesulfonate, and polynaphthalenesulfonate are significantly inferior in their activity to the weakly anionic, polyalkylene oxide-containing copolymers. These copolymers are also referred to as polycarboxylate ethers (PCEs). Polycarboxylate ethers not only disperse the inorganic particles via electrostatic charging, owing to the anionic groups (carboxylate groups, sulfonate groups) present on the main chain, but also, furthermore, stabilize the dispersed particles by steric effects, owing to the polyalkylene oxide side chains, which by absorbing water molecules form a stabilizing protective layer around the particles.

As a result, it is either possible to reduce the required amount of water for the formulating of a particular consistency, as compared with the conventional plasticizers, or else the addition of the polycarboxylate ethers reduces the plasticity of the wet building-material mixture to such an extent that it is possible to produce self-compacting concrete or self-compacting mortar with low water/cement ratios. The use of the polycarboxylate ethers also makes it possible to produce ready-mixed concrete or ready-mixed mortar that remains pumpable for lengthy periods of time, or to produce high-strength concretes or high-strength mortars by formulating a low water/cement ratio.

Dispersants based on polycarboxylate ethers and derivatives thereof are available either as solids in powder form or as aqueous solutions. Polycarboxylate ethers in powder form may be admixed, for example, to a factory dry mortar or factory dry concrete in the course of its production. When the factory dry mortar is mixed with water, the polycarboxylate ethers dissolve and are able subsequently to develop their effect.

For the production of dry mortars or factory dry concretes, in particular, the dispersant must be present as a solid in powder form.

In many cases, however, it is difficult to produce dispersants in powder form, since the polymers cannot be obtained directly in powder form during production, or the resulting powders do not have the desired performance properties.

Known in this regard from DE 199 05 488 are polymer compositions in powder form and based on polyethercarboxylates, these compositions comprising 5 to 95 wt % of the water-soluble polymer and 5 to 95 wt % of a finely divided mineral carrier material. The products are produced by contacting the mineral carrier material with a melt or an aqueous solution of the polymer. Advantages touted for this product, in comparison to spray-dried products, are a significantly increased resistance to sticking and to caking.

It is also known practice to add further auxiliaries to the polymers in the course of drying. For instance, WO 0017263 describes the production of water-soluble polymer powders based on polyether carboxylates, by drying of aqueous polymer solutions with addition of stabilizers.

EP 1052232 describes the production of a dispersant in powder form where a reducing agent is added to the liquid, which comprises a polyether carboxylate, and the liquid comprising a reducing agent is subsequently dried and powdered.

This has the disadvantage, however, of reducing the active ingredient content of the powders and thus giving rise to greater transport costs, and that the auxiliaries frequently lead to unwanted properties in the binder composition and in this context, for example, retard the hardening reaction.

It was an object of the present invention, accordingly, to provide dispersants which possess good properties in respect of their metering robustness and slump retention and which at the same time can easily be converted into powder form and have good performance powder properties.

The powder here ought in particular to exhibit high flowability, temperature robustness, low caking tendency, and high insensitivity to shearing. The amount of auxiliaries in the polymer powder here ought to be as low as possible, with such auxiliaries preferably being avoided entirely.

This object has been achieved by means of a polymer obtainable by copolymerizing monomers comprising (I) at least one ethylenically unsaturated monomer which comprises at least one acid group and (II) at least one ethylenically unsaturated monomer having polyether groups of the structural unit (IIa),

  (IIa)

where n is an integer from 5 to 35, a independently at each occurrence for each $(C_aH_{2a}O)$ unit identically or differently is 2, 3 or 4, and (III) at least one ethylenically unsaturated monomer having polyether groups of the structural unit (IIIa),

  (III a)

where m is an integer from 45 to 150, b independently at each occurrence for each $(C_bH_{2b}O)$ unit identically or differently is 2, 3 or 4, and where the molar ratio of monomer (II) to monomer (III) is between 75:25 and 99.5:0.5.

Surprisingly it has emerged here that the polymer of the invention not only completely achieves the stated object but also, furthermore, leads to very good segregation properties of the system in inorganic binder compositions, over a wide polymer metering range.

It is essential to the invention that the polymerizable monomer (I) comprises an acid group. In the present specification, the term "acid group" refers both to the free acid and to the salts thereof. The acid may preferably be at least one from the series consisting of carboxyl, phosphono, sulfino, sulfo, sulfamido, sulfoxy, sulfoalkyloxy, sulfinoalkyloxy, and phosphonooxy group. Particularly preferred are carboxyl and phosphonooxy groups.

In one preferred embodiment the ethylenically unsaturated monomer (I) is represented by at least one of the following general formulae from the group consisting of (Ia), (Ib), and (Ic):

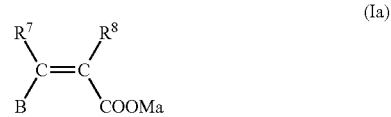

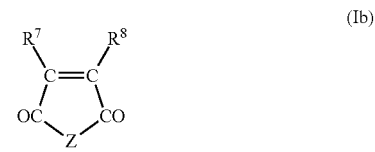

In the case of the monocarboxylic or dicarboxylic acid derivative (Ia) and the monomer present in cyclic form (Ib), where Z=O (acid anhydride) or $NR^{16}$ (acid imide), $R^7$ and $R^8$ independently of one another are hydrogen or an aliphatic hydrocarbon radical having 1 to 20 carbons, preferably a methyl group. B is H, —$COOM_a$, —CO—$O(C_qH_{2q}O)_r$—$R^9$, —CO—NH—$(C_qH_{2q}O)_r$—$R^9$.

M is hydrogen, a mono- or divalent metal cation, preferably sodium, potassium, calcium or magnesium ion, or else ammonium or an organic amine radical, and also a=½ or 1, depending on whether M is a monovalent or a divalent cation. Organic amine radicals used are preferably substituted ammonium groups deriving from primary, secondary or tertiary $C_{1-20}$ alkylamines, $C_{1-20}$ alkanolamines, $C_{5-8}$ cycloalkylamines, and $C_{6-14}$ arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^9$ is hydrogen, an aliphatic hydrocarbon radical having 1 to 20 carbons, a cycloaliphatic hydrocarbon radical having 5 to 8 carbons, an aryl radical having 6 to 14 carbons, it being possible optionally for this radical also to be substituted, q=2, 3 or 4 and r=0 to 200, preferably 1 to 150. The aliphatic hydrocarbons here may be linear or branched and also saturated or unsaturated. Preferred cycloalkyl radicals are cyclopentyl or cyclohexyl radicals, and preferred aryl radicals are phenyl or naphthyl radicals, which in particular may also be substituted by hydroxyl, carboxyl or sulfonic acid groups. Moreover, Z is O or $NR^{16}$, where $R^{16}$ independently at each occurrence is identical or different and represented by a branched or unbranched $C_1$ to $C_{10}$ alkyl radical, $C_5$ to $C_8$ cycloalkyl radical, aryl radical, heteroaryl radical or H.

The following formula is the monomer (Ic):

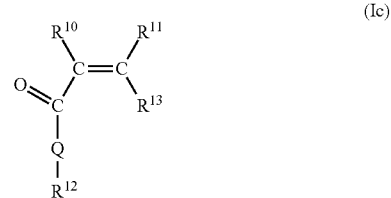

In this formula, $R^{19}$ and $R^{11}$ independently of one another are hydrogen or an aliphatic hydrocarbon radical having 1 to 20 carbons, a cycloaliphatic hydrocarbon radical having 5 to 8 carbons, an optionally substituted aryl radical having 6 to 14 carbons. Q may be identical or different and is represented by NH, $NR^{15}$ or O, where $R^{15}$ is an aliphatic hydrocarbon radical having 1 to 10 carbons, a cycloaliphatic hydrocarbon radical having 5 to 8 carbons or an optionally substituted aryl radical having 6 to 14 carbons.

Moreover, $R^{12}$ is identical or different and is represented by $(C_nH_{2n})$—$SO_3H$ with n=0, 1, 2, 3 or 4, $(C_nH_{2n})$—OH with n=0, 1, 2, 3 or 4; $(C_nH_{2n})$—$PO_3H_2$ with n=0, 1, 2, 3 or 4, $(C_nH_{2n})$—$OPO_3H_2$ with n=0, 1, 2, 3 or 4, $(C_6H_4)$—$SO_3H$, $(C_6H_4)$—$PO_3H_2$, $(C_6H_4)$—$OPO_3H_2$, and $(C_nH_{2n})$—$NR^{14}b$ with n=0, 1, 2, 3 or 4 and b=2 or 3.

$R^{13}$ is H, —$COOM_a$, —CO—$O(C_qH_{2q}O)_r$—$R^9$, —CO—NH—$(C_qH_{2q}O)_r$—$R^9$, where $M_a$, $R^9$, q, and r possess the definitions stated above.

$R^{14}$ is hydrogen, an aliphatic hydrocarbon radical having 1 to 10 carbons, a cycloaliphatic hydrocarbon radical having 5 to 8 carbons, an optionally substituted aryl radical having 6 to 14 carbons.

In one preferred embodiment the ethylenically unsaturated monomer (I) comprises at least one compound from the series consisting of acrylic acid, methacrylic acid, crotonic acid, itaconic acid, maleic acid, fumaric acid, vinylsulfonic acid, allylsulfonic acid, sulfoethyl methacrylate, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, vinylphosphonic acid, allylphosphonic acid, N-(meth)acrylamidoalkylphosphonic acids, and (meth)acryloyloxyalkylphosphonic acids. More preferably the ethylenically unsaturated monomer (I) comprises at least one compound from the series consisting of acrylic acid, methacrylic acid, and maleic acid, especially acrylic acid.

Especially preferably the monomer (II) of the invention is represented by the general formula (IIb)

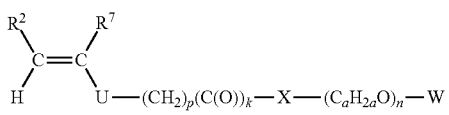

(IIb)

where
U is oxygen or a chemical bond,
p is an integer between 0 and 4,
X is oxygen, sulfur or a group $NR^3$,
k is 0 or 1,
W is a hydrogen, a $C_1$-$C_6$ alkyl or an aryl radical or is the group Y—F, where
Y is a linear or branched alkylene group having 2 to 8 carbons and may carry a phenyl ring,
F is a 5- to 10-membered nitrogen heterocycle which is bonded via nitrogen and which as ring members, besides the nitrogen atom and besides carbon atoms, may have 1, 2 or 3 additional heteroatoms selected from oxygen, nitrogen, and sulfur, it being possible for the nitrogen ring members to have a group $R^4$, and for 1 or 2 carbon ring members to be carbonyl group(s),
$R^1$, $R^2$, $R^3$, and $R^4$ independently of one another are hydrogen or an aliphatic hydrocarbon radical having 1 to 4 carbons, or benzyl, and n and a possess the definitions stated for structural unit (IIa).

Especially preferably the monomer (III) of the invention is represented by the general formula (IIIb)

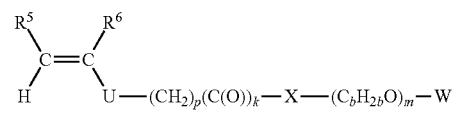

(IIIb)

where
U is oxygen or a chemical bond,
p is an integer between 0 and 4,
X is oxygen, sulfur or a group $NR^3$,
k is 0 or 1,
W is a hydrogen, a $C_1$-$C_6$ alkyl or an aryl radical or is the group Y—F, where
Y is a linear or branched alkylene group having 2 to 8 carbons and may carry a phenyl ring,
F is a 5- to 10-membered nitrogen heterocycle which is bonded via nitrogen and which as ring members, besides the nitrogen atom and besides carbon atoms, may have 1, 2 or 3 additional heteroatoms selected from oxygen, nitrogen, and sulfur, it being possible for the nitrogen ring members to have a group $R^4$, and for 1 or 2 carbon ring members to be carbonyl group(s),
$R^3$, $R^4$, $R^5$, and $R^6$ independently of one another are hydrogen or an aliphatic hydrocarbon radical having 1 to 4 carbons, or benzyl, and
m and b possess the definitions stated for structural unit (IIIa).

Independently of one another, with regard to the formulae (IIb) and (IIIb), it is preferred in each case if U is oxygen, p is 4, X is oxygen, k is 0, and $R^1$, $R^2$, $R^5$, and $R^6$ independently of one another are hydrogen or a methyl group.

With regard to the polymer of the invention, it is especially preferable if n is an integer from 20 to 30 and a independently at each occurrence for each $(C_aH_{2a}O)$ unit identically or differently is 2 or 3. Very preferably n is an integer from 20 to 30 and a for each $(C_aH_{2a}O)$ unit is 2.

Furthermore, with regard to the polymer of the invention, it is especially preferable if m is an integer from 65 to 75 and b independently at each occurrence for each $(C_bH_{2b}O)$ unit identically or differently is 2 or 3. Very preferably n is an integer from 65 to 75 and a for each $(C_aH_{2a}O)$ unit is 2.

Generally it may be said that the $(C_aH_{2a}O)$ unit and the $(C_bH_{2b}O)$ unit with particular preference are pure polyethoxy side chains, although also preferably it is possible for there to be mixed polyalkoxy side chains, more particularly those which contain both propoxy and ethoxy groups.

In practice the polyether macromonomer commonly employed is alkoxylated isoprenol, i.e., alkoxylated 3-methyl-3-buten-1-ol and/or alkoxylated hydroxybutyl vinyl ether and/or alkoxylated (meth)allyl alcohol, with methallyl alcohol being preferred over allyl alcohol. Particularly preferred is alkoxylated hydroxybutyl vinyl ether.

The polymer of the invention comprises at least three monomer units. Besides the monomers (I), (II), and (III), there may be further types of monomer employed in the copolymer of the invention. Examples of suitable further monomers encompass acrylamide and methacrylamide, preferably acrylamide, and also derivatives thereof, such as, for example, N-methyl(meth)acrylamide, N,N'-dimethyl (meth)acrylamide, and N-methylolacrylamide. Further monomers to be stated are N-vinyl derivatives such as N-vinylformamide, N-vinylacetamide, N-vinylpyrrolidone or N-vinylcaprolactam. Also to be stated are monomers containing OH groups, such as hydroxyethyl (meth)acrylate, hydroxypropyl (meth)acrylate, (meth)allyl alcohol, hydroxyvinyl ethyl ether, hydroxyvinyl propyl ether, 3-methyl-3-buten-1-ol or hydroxyvinyl butyl ether. Preferably the further monomer optionally present in the polymer of the invention comprises monomers containing OH groups and/or derivatives of such monomers, more preferably hydroxyvinyl butyl ether and also 3-methyl-3-buten-1-ol.

In one preferred embodiment the total sum of the monomers (I), (II), and (III) in the polymer of the invention is 100 wt %. It may, however, also be advantageous to use polymers having four or more monomer units. In a further-preferred embodiment, the polymer of the invention therefore comprises not only the monomer units (I), (II), and (III) but also from 1 to 40 wt %, preferably 5 to 30 wt %, especially preferably 10 to 20 wt %, of at least one further monomer unit.

The molar fraction of the monomers (I), (II), and (III) in the copolymer of the invention may be selected freely within wide ranges. It has proven particularly advantageous if the fraction of the monomer (I) in the copolymer is 50 to 90 mol %, preferably 60 to 80 mol %, and especially 65 to 78 mol %. Furthermore, the fraction of the monomer (II) and the fraction of the monomer (III) in the polymer of the invention together are preferably 10 to 50 mol %, more particularly 15 to 45 mol %, and very preferably 20 to 35 mol %.

It is essential to the invention that the molar ratio of monomer (II) to monomer (III) is between 75:25 and 99.5:0.5. The molar ratio of monomer (II) to monomer (III) is preferably between 80:20 and 99:1. With particular preference the molar ratio of monomer (II) to monomer (III) is between 85:15 and 98:2 and very preferably between 90:10 and 97.0:3.

In a further-preferred embodiment, the polymer of the invention possesses a molecular weight of 15 000 g/mol to 40 000 g/mol, preferably 20 000 to 35 000 g/mol, determined by gel permeation chromatography against polyethylene glycol standards.

The polymer of the invention is in particular in powder form. For the purposes of the present invention, the polymer in powder form ought preferably to be dry, this meaning that it has a Karl-Fischer water content of less than 5 wt %, preferably less than 1 wt %, and more preferably of less than 0.1 wt %.

It is preferred for the polymer of the invention in powder form to have an average particle size of between 0.1 and 1000 µm, more preferably between 1 and 200 µm. The particle size in this case is determined by laser diffractometry.

The present invention envisages the use of the polymer of the invention as an admixture for inorganic binder compositions. The polymer of the invention may more particularly be used as a dispersant in inorganic binder compositions.

A further subject of the present invention is a method for producing the polymers of the invention. The copolymers of the invention can be produced by techniques which are known in principle to the skilled person, by radical polymerization of the monomers (I), (II), and (III) and, optionally, further monomers, as for example by bulk, solution, gel, emulsion, dispersion or suspension polymerization, preferably in aqueous phase.

The present invention therefore also relates to a method for producing a polymer of the invention described above, where the monomers (I), (II), and (III) are subjected to aqueous solution polymerization. A particularly suitable solvent when producing the copolymers of the invention is water. It is, however, also possible to use a mixture of water and an organic solvent, in which case the solvent ought to be very largely inert with respect to radical polymerization reactions. More particularly the organic solvent may comprise at least one solvent from the series consisting of ethyl acetate, n-butyl acetate, 1-methoxy-2-propyl acetate, ethanol, isopropanol, n-butanol, 2-ethylhexanol, 1-methoxy-2-propanol, ethylene glycol, propylene glycol, acetone, butanone, pentanone, hexanone, methyl ethyl ketone, ethyl acetate, butyl acetate, amyl acetate, tetrahydrofuran, diethyl ether, toluene, xylene, or higher-boiling alkylbenzenes. It may also comprise polyethylene glycol ethers or polypropylene glycol ethers or statistical ethylene oxide/propylene oxide copolymers having an average molar mass of 200 to 2000 g/mol, mono-, di- or triethylene glycol, mono-, di- or tripropylene glycol, methyl, ethyl, propyl, butyl or higher alkyl polyalkylene glycol ethers having 1, 2, 3 or more ethylene glycol and/or propylene glycol units, examples being methoxypropanol, dipropylene glycol monomethyl ether, tripropylene glycol monomethyl ether, ethylene glycol monobutyl ether, diethylene glycol monobutyl ether, butyl polyethylene glycol ether, propyl polyethylene glycol ether, ethyl polyethylene glycol ether, methyl polyethylene glycol ether, dimethyl polyethylene glycol ether, dimethyl polypropylene glycol ether, glycerol ethoxylates having a molecular weight of 150 to 20 000 g/mol, pentaerythritol alkoxylates, ethylene carbonate, propylene carbonate, glycerol carbonate, glycerol formal, and 2,3-O-isopropylideneglycerol. Especially preferred are alkyl polyalkylene glycol ethers and more preferably methyl polyethylene glycol ether and also polyethylene glycol ethers, polypropylene glycol ethers, and statistical ethylene oxide/propylene oxide copolymers having an average molar mass of 150 to 2000 g/mol. Additionally preferred are solvents based on carbonates, especially ethylene carbonate, propylene carbonate, and glycerol carbonate.

The polymerization reaction takes place preferably in the temperature range between 0 and 180° C., more preferably between 10 and 100° C., either under atmospheric pressure or else under elevated or reduced pressure. The polymerization may optionally also be performed in an inert gas atmosphere, preferably under nitrogen.

To initiate the polymerization it is possible to use high-energy electromagnetic radiation, mechanical energy or chemical polymerization initiators such as organic peroxides, e.g., benzoyl peroxide, tert-butyl hydroperoxide, methyl ethyl ketone peroxide, cumoyl peroxide, dilauroyl peroxide, or azo initiators, such as azodiisobutyronitrile, azobisamidopropyl hydrochloride, and 2,2'-azobis(2-methyl-butyronitrile). Likewise suitable are inorganic peroxy compounds, such as ammonium peroxodisulfate, potassium peroxodisulfate or hydrogen peroxide, optionally in combination with reducing agents (e.g., sodium hydrogensulfite, ascorbic acid, iron(II) sulfate) or redox systems which as reducing component comprise an aliphatic or aromatic sulfonic acid (e.g., benzenesulfonic acid, toluenesulfonic acid). Especial preference is given to a mixture of at least one sulfinic acid with at least one iron(III) salt, and/or to a mixture of ascorbic acid with at least one iron(III) salt.

Chain transfer agents (CTAs) for regulating molecular weight are the customary compounds. Examples of suitable known CTAs include alcohols, such as methanol, ethanol, propanol, isopropanol, n-butanol, sec-butanol, and amyl alcohols, aldehydes, ketones, alkylthiols, such as dodecylthiol and tert-dodecylthiol, for example, thioglycolic acid, isooctyl thioglycolate, 2-mercaptoethanol, 2-mercaptopropionic acid, 3-mercaptopropionic acid, and certain halogen compounds, such as carbon tetrachloride, chloroform, and methylene chloride, for example.

A further subject of the present invention is a composition in powder form comprising, based on the total mass of the composition, A) at least 20 wt % of an inorganic binder and
B) 0.01 to 4 wt % of at least one polymer of the invention.

The inorganic binder is preferably at least one from the series consisting of cement based on Portland cement, white cement, calcium aluminate cement, calcium sulfoaluminate cement, calcium sulfate n-hydrate, and latent hydraulic and/or pozzolanic binder.

The composition of the invention in powder form is preferably a dry-mix mortar. As a result of continual efforts toward extensive rationalization, and of improved product quality, mortars for a very wide variety of different uses within the construction sector are nowadays hardly any longer mixed together from the starting materials on the building site itself. This function is nowadays largely carried out by the construction materials industry in the factory, and the ready-to-use mixtures are provided in the form of what are called factory dry-mix mortars. Finished mixtures which can be made workable on site exclusively by addition of water and mixing are referred to according to DIN 18557 as factory mortars, more particularly as factory dry-mix mortars. Mortar systems of this kind may fulfill any of a very wide variety of physical construction objectives. Depending on the objective that exists, the binder, which may comprise cement and/or lime and/or calcium sulfate, for example, is admixed with further additives or admixtures in order to adapt the factory dry-mix mortar to the specific application. The additives and admixtures in question may comprise, for example, shrinkage reducers, expansion agents, accelerators, retardants, dispersants, thickeners, defoamers, air entrainers, and corrosion inhibitors.

The factory dry-mix mortar of the invention may comprise, in particular, masonry mortars, render mortars, mortars for thermal insulation composite systems, renovating renders, jointing mortars, tile adhesives, thin-bed mortars, screed mortars, casting mortars, injection mortars, filling compounds, grouts, or lining mortars (e.g., for drinking-water pipes), or self-leveling compositions.

Another subject of the present invention is a method for producing a binder composition of the invention, where the polymer of the invention in powder form is mixed with an inorganic binder and, optionally, further additives.

The composition of the invention in powder form that comprises at least one inorganic binder may have a binder composed more particularly of a binder mixture. A binder mixture in the present context refers to mixtures of at least two binders from the series consisting of cement, pozzolanic and/or latent hydraulic binder, white cement, specialty cement, calcium aluminate cement, calcium sulfoaluminate cement, and the various hydrous and anhydrous calcium sulfates. These mixtures may then optionally comprise further additives as well.

In one particularly preferred embodiment, the composition of the invention in powder form comprises at least one filler from the series consisting of silica sand, finely ground quartz, limestone, heavy spar, calcite, aragonite, vaterite, dolomite, talc, kaolin, mica, chalk, titanium dioxide, rutile, anatase, aluminum hydroxide, aluminum oxide, magnesium hydroxide, and brucite. More particularly the composition of the invention in powder form may consist to an extent of at least 50 wt %, more particularly at least 60 wt %, and very preferably at least 75 wt % of at least one compound from the series consisting of silica sand, finely ground quartz, limestone, heavy spar, calcite, aragonite, vaterite, dolomite, talc, kaolin, mica, chalk, titanium dioxide, rutile, anatase, aluminum hydroxide, aluminum oxide, magnesium hydroxide, and brucite.

The inorganic binder may in particular be gypsum. The expression "gypsum" is used synonymously in the present context with calcium sulfate, and the calcium sulfate may be present in its various anhydrous and hydrated forms with and without water of crystallization. Natural gypsum substantially comprises calcium sulfate dihydrate ("dihydrate"). The natural form of calcium sulfate free of water of crystallization is encompassed by the expression "anhydrite". As well as the naturally occurring forms, calcium sulfate is a typical byproduct of industrial processes, and is then referred to as "synthetic gypsum". A typical example of a synthetic gypsum from industrial processes is flue gas desulfurization. Synthetic gypsum, however, may equally also be formed as the byproduct of phosphoric acid or hydrofluoric acid production processes. Typical gypsum ($CaSO_4 \times 2\ H_2O$) can be calcined, with the water of crystallization being removed. Products of the wide variety of different calcining processes are α- or β-hemihydrate. β-Hemihydrate results from rapid heating in open vessels, accompanied by rapid evaporation of water, forming voids. α-Hemihydrate is produced by the dewatering of gypsum in closed autoclaves. The crystal habit in this case is relatively impervious, and so this binder requires less water for liquefaction than does β-hemihydrate. On the other hand, hemihydrate undergoes rehydration with water to form dihydrate crystals. Gypsum hydration customarily takes from several minutes to hours, resulting in a shortened working time as compared with cements, which require several hours to days for complete hydration. These qualities make gypsum a useful alternative to cements as binders in a wide variety of areas. Moreover, fully cured gypsum products exhibit pronounced hardness and compressive strength. In one particularly preferred embodiment, the composition of the invention in powder form is a self-leveling calcium sulfate screed.

A further subject of the present invention is a composition in powder form comprising the polymer of the invention and at least one organic and/or inorganic pigment which is suitable in particular for the production of paints, colors, and plastics, and also printer inks. With preference the composition of the invention in powder form is an inorganic pigment composition. This composition may preferably comprise at least one compound from the series consisting of titanium dioxides, zinc sulfides, zinc oxides, iron oxides, magnetites, manganese iron oxides, chromium oxides, ultramarine, nickel antimony titanium oxides, chromium antimony titanium oxides, manganese titanium rutiles, cobalt oxides, mixed oxides of cobalt and aluminum, rutile mixed phase pigments, sulfides of the rare earths, spinels of cobalt with nickel and zinc, spinels based on iron and chromium with copper zinc and also manganese, bismuth vanadates and extender pigments. More particularly the composition in powder form may comprise the Colour Index pigment Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Mixtures of inorganic pigments are also preferred. Mixtures of organic with inorganic pigments may likewise be employed. The compositions of the invention that are based hereon are suitable for producing pigment dispersions which can be used as tinting pastes, pigment slurries, pigment dispersions or pigment preparations in the paints and coatings industry, in the ceramic industry, and in the textiles and leather industries, among others.

Also possible in particular is the production of compositions of the invention based on transparent iron oxide pigments with which transparent aqueous or solventborne varnishes for wood coating can be produced. In one particular embodiment, the composition of the invention in powder form is employed in aqueous emulsion paints. In this case the composition of the invention in powder form is based preferably on a powder which is based on white pigment, more particularly titanium dioxide, barium sulfate, and zinc sulfite, and/or on chromatic pigment, more particularly iron oxide pigments, chromium dioxide and cobalt spinel pigments and/or natural or precipitated calcium carbonate, talc, kaolin, finely ground quartz, and other mineral pigments. The powder of the invention may in particular consist to an extent of at least 50 wt %, more particularly at least 90 wt %, and very preferably at least 98 wt % of at least one organic and/or inorganic pigment. The polymer of the invention is used preferably in an amount of 0.01 to 6 wt %, more preferably 0.1 to 2 wt %, the amount being based on the total composition of the invention in powder form, comprising the at least one organic and/or inorganic pigment.

The examples which follow are intended to elucidate the invention in more detail.

EXAMPLES

Synthesis of the Dispersants

A 1 liter four-neck flask with thermometer, reflux condenser, and a connection for two feeds was charged with 540 g of water and a total of 370 g of vinyloxybutyl polyethylene glycol having 22 EO units and/or vinyloxybutyl polyethylene glycol having 65 EO units, in accordance with table 1. 0.01 g of iron(II) sulfate, 1.4 g of mercaptoethanol, and 8 g of Brüggolit FF6 from Brüggemann GmbH (mixture of sodium sulfite, the disodium salt of 2-hydroxy-2-sulfinatoacetic acid, and the disodium salt of 2-hydroxy-2-sulfonatoacetic acid) were dissolved. The solution was cooled to 13° C. The amount of acrylic acid corresponding to table 1 was added. Then, immediately, 4 g of 50% strength hydrogen peroxide solution were added rapidly. After the end of the exothermic reaction, stirring was continued for 5 minutes and neutralization to a pH of 7 took place using NaOH.

TABLE 1

| Experiment | VOBPEG 3000 (molar fractions) | VOBPEG 1100 (molar fractions) | Acrylic acid (molar fractions) | Charge density [meq/g] |
|---|---|---|---|---|
| 1 | 0.1 | 0.9 | 3 | 0.4 |
| 2 | 0.2 | 0.8 | 3 | 0.46 |
| 3 | 0.1 | 0.9 | 3.5 | 0.34 |
| 4 | 0.2 | 0.8 | 4 | 0.35 |
| 5 | 0.05 | 0.95 | 3 | 0.36 |
| 6 | 0.15 | 0.85 | 3.5 | 0.37 |
| 7 (comparative) | 0 | 1 | 3 | 0.33 |
| 8 (comparative) | 1 | 0 | 9 | 0.33 |
| 9 (comparative) | 0.4 | 0.6 | 5 | 0.36 |
| 10 (comparative) | 0.3 | 0.7 | 5 | 0.32 |
| 11 (comparative) | 0.4 | 0.6 | 3 | 0.6 |
| 12 (comparative) | 0.3 | 0.7 | 3 | 0.53 |

VOBPEG 3000: vinyloxybutyl polyethylene glycol having 65 EO units
VOBPEG 1000: vinyloxybutyl polyethylene glycol having 22 EO units Powder Quality The powder quality was determined by means of DSC (differential scanning calorimetry) (heating/cooling rate 5 K/min). The factor determining powder quality and stability selected is the melting point. As a qualitative assessment, a mortar test was employed. Here, the powder was heated to 40° C. in a mortar and then ground with the pestle for 30 seconds under constant pressure. If the material retained its powder form, the powder stability was evaluated as "++"; if it altered its appearance only slightly, it was evaluated as "+". If substantial agglomerates were formed, an evaluation of "−" was awarded. The results are set out in table 2.

TABLE 2

| Dispersant | Melting point [° C.] | Rating |
|---|---|---|
| 1 | 35 | + |
| 2 | 40 | ++ |
| 3 | 42 | ++ |
| 4 | 41 | ++ |
| 5 | 30 | + |
| 6 | 45 | ++ |
| 7 (comparative) | 20 | − |
| 8 (comparative) | 56 | ++ |
| 9 (comparative) | 52 | ++ |
| 10 (comparative) | 50 | ++ |

Application Tests

The polymers were tested as dispersants in cement and CaSO$_4$ anhydride.

Calcium Sulfate Anhydride:

394 g synthetic anhydride 600 g standard sand 140 g water 3.94 g K$_2$SO$_4$

Dispersant from experiments 1 to 12

Mixing procedure as per EN 196 Part I with Hägermann ring

TABLE 3

| Dispersant | Metering | Slump [cm] | | | | | Solidification [h] | |
|---|---|---|---|---|---|---|---|---|
| | | 0 min | 5 min | 30 min | 60 min | 90 min | BS | ES |
| 1 | 0.09 | 27 | 26 | 23.5 | 23 | 22.5 | 8.5 | 10.4 |
| 2 | 0.08 | 26.5 | 25.5 | 23.5 | 22.5 | 22 | 7.9 | 9.7 |
| 3 | 0.09 | 27 | 26 | 23.5 | 23 | 22.5 | 7.7 | 10.4 |
| 4 | 0.08 | 26.5 | 25.5 | 23.5 | 22.5 | 22 | 8.0 | 10.5 |
| 5 | 0.09 | 27 | 26 | 24 | 24 | 23.5 | 8.5 | 10.4 |
| 6 | 0.08 | 27 | 25 | 23 | 22.5 | 22.5 | 8.9 | 10.1 |
| 7 | 0.09 | 27 | 26 | 23.5 | 23 | 22.5 | 15.3 | 20.1 |
| 8 | 0.07 | 27 | 23.5 | 22 | 19.5 | 18 | 7.6 | 9.5 |
| 9 | 0.07 | 28 | 26 | 24 | 23 | 22 | 8.0 | 9.9 |
| 10 | 0.08 | 27 | 26 | 24 | 23 | 22 | 7.9 | 10.0 |

TABLE 3-continued

| Dispersant | Metering | Slump [cm] | | | | | Solidification [h] | |
| --- | --- | --- | --- | --- | --- | --- | --- | --- |
| | | 0 min | 5 min | 30 min | 60 min | 90 min | BS | ES |
| 11 | 0.12 | 28 | 23 | 22.5 | 22 | 21.5 | 8.1 | 10.0 |
| 12 | 0.12 | 27 | 26.5 | 24.5 | 23 | 22 | 7.3 | 9.6 |

The metering relates to the synthetic anhydride and is stated in wt %
BS: beginning of solidification
ES: end of solidification
The solidification times were determined in analogy to DIN-EN 480-2.

Segregation Tendency in Anhydrite Mortar

The robustness is also reflected in the stability toward bleeding. In this case a cylindrical cone was used with a height of 450 mm and a width of 50 mm. The mortar employed was the following formulation:
394 g synthetic anhydride
600 g standard sand
140 g water
4 g potassium sulfate
Dispersants from experiments 5 to 12 in analogy to the metering from table 3

The mixture was stirred for 30 seconds following addition of water. 450 ml of this mortar were introduced into the cone, and after 10 minutes the bleed water was drawn off and the volume was ascertained.

TABLE 4

| Dispersant | Bleed water [ml] |
| --- | --- |
| 5 | 3 |
| 6 | 6.1 |
| 7 | 2 |
| 8 | 25 |
| 9 | 26 |
| 10 | 25 |
| 11 | 24 |
| 12 | 56 |

A Further Round of Measurement was Carried Out with the Following Mixture:
900 g synthesis anhydride
1350 g standard sand
9 g potassium sulfate
The water/binder ratio was w/b=0.35

TABLE 5

| Dispersant | Metering | Slump [cm] | | | | | Solidification [h:min] | | Bleeding after 30 min [g] |
| --- | --- | --- | --- | --- | --- | --- | --- | --- | --- |
| | | 0 min | 5 min | 30 min | 60 min | 90 min | BS | ES | |
| 7 | 0.07 | 28 | 25.5 | 25.4 | 23 | 22.3 | 15:04 | 22:22 | 0 |
| 9 | 0.07 | 28.4 | 26.1 | 24.8 | 23.6 | 22.6 | 16:20 | 20:00 | 0.06 |
| 3 | 0.08 | 28.5 | 26.7 | 25.5 | 24.2 | 23.5 | 13:06 | 19:20 | 0.03 |

The metering relates to the synthesis anhydride and is stated in wt %.
BS: beginning of solidification
ES: end of solidification
The amount of bleed water was determined in a 210 ml volumetric cylinder having a diameter of 4 cm and a filling height of 18 cm Testing of Different Plasticizers in Cement Mortar:
Cement/silica sand 1/1
w/c=0.35
Dispersants from experiments 1 to 7

The slump was adjusted to an initial slump in the Hägermann ring without tapping of 13+/−0.5 cm. The Marsh funnel indicates the flow transit time of the mortar mixture at comparable slump (ASTM C939-10).

TABLE 6

| Dispersant | Metering | Slump [cm] | | | | Flow transit time [s] |
| --- | --- | --- | --- | --- | --- | --- |
| | | 0 min | 5 min | 30 min | 60 min | |
| 1 | 0.20 | 13.3 | 10.4 | 8.5 | 7.3 | 90 |
| 3 | 0.220 | 13.8 | 10.5 | 7.9 | 6.9 | 90 |
| 7 | 0.225 | 13.1 | 10.3 | 8.0 | 7.6 | 104 |
| 8 | 0.20 | 13.8 | 13.9 | 14.9 | 16.0 | 155 |

The metering relates to the cement and is stated in wt %

BRIEF DESCRIPTION OF THE FIGURE

To evaluate the metering robustness, different w/c ratios (0.38; 0.40; 0.42) were set for the same metering (FIGURE).

Only the dispersants of the invention exhibited good powder quality at the same time as good performance properties.

The invention claimed is:

1. A polymer obtained by copolymerizing monomers comprising
   (I) at least one ethylenically unsaturated monomer which comprises at least one acid group and
   (II) at least one ethylenically unsaturated monomer having polyether groups of the structural unit (IIa), $$—(C_aH_{2a}O)_n— \quad (IIa)$$

where
   n is an integer from 5 to 35,
   a independently at each occurrence for each $(C_aH_{2a}O)$ unit identically or differently is 2, 3 or 4, and
   (III) at least one ethylenically unsaturated monomer having polyether groups of the structural unit (IIIa), $$—(C_bH_{2b}O)_m— \quad (IIIa)$$

where
   m is an integer from 45 to 150,
   b independently at each occurrence for each $(C_bH_{2b}O)$ unit identically or differently is 2, 3 or 4, and
   where the molar ratio of monomer (II) to monomer (III) is between 75:25 and 99.5:0.5.

2. The polymer according to claim 1, wherein the acid group of the monomer (I) is at least one from the group consisting of carboxyl, phosphono, sulfino, sulfo, sulfamido, sulfoxy, sulfoalkyloxy, sulfinoalkyloxy, and phosphonooxy.

3. The polymer according to claim 1, wherein monomer (II) is represented the general formula (IIb)

$$\begin{array}{c} R^2 \\ \diagdown \\ C=C \\ \diagup \quad \diagdown \\ H \qquad U-(CH_2)_p(C(O))_k-X-(C_aH_{2a}O)_n-W \end{array} \quad (IIb)$$

where
U is oxygen or a chemical bond,
p is an integer between 0 and 4,
X is oxygen, sulfur or a group $NR^3$,
k is 0 or 1,
W is a hydrogen, a $C_1$-$C_6$ alkyl or an aryl radical or is the group Y-F, where
Y is a linear or branched alkylene group having 2 to 8 carbons and may carry a phenyl ring,
F is a 5- to 10-membered nitrogen heterocycle which is bonded via nitrogen and which as ring members, besides the nitrogen atom and besides carbon atoms, may have 1, 2 or 3 additional heteroatoms selected from oxygen, nitrogen, and sulfur, it being possible for the nitrogen ring members to have a group $R^4$, and for 1 or 2 carbon ring members to be carbonyl group(s),
$R^1$, $R^2$, $R^3$, and $R^4$ independently of one another are hydrogen or an aliphatic hydrocarbon radical having 1 to 4 carbons, or benzyl, and
where
n is an integer from 5 to 35, and
a independently at each occurrence for each $(C_aH_{2a}O)$ unit identically or differently is 2 3 or 4.

4. The polymer according to claim 1, wherein monomer (III) is represented by the general formula (IIIb)

$$\begin{array}{c} R^5 \\ \diagdown \\ C=C \\ \diagup \quad \diagdown \\ H \qquad U-(CH_2)_p(C(O))_k-X-(C_bH_{2b}O)_m-W \end{array} \quad (IIIb)$$

where
U is oxygen or a chemical bond,
p is an integer between 0 and 4,
X is oxygen, sulfur or a group $NR^3$,
k is 0 or 1,
W is a hydrogen, a $C_1$-$C_6$ alkyl or an aryl radical or is the group Y-F, where
Y is a linear or branched alkylene group having 2 to 8 carbons and may carry a phenyl ring,
F is a 5- to 10-membered nitrogen heterocycle which is bonded via nitrogen and which as ring members, besides the nitrogen atom and besides carbon atoms, may have 1, 2 or 3 additional heteroatoms selected from oxygen, nitrogen, and sulfur, it being possible for the nitrogen ring members to have a group $R^4$, and for 1 or 2 carbon ring members to be carbonyl group(s),
$R^3$, $R^4$, $R^5$, and $R^6$ independently of one another are hydrogen or an aliphatic hydrocarbon radical having 1 to 4 carbons, or benzyl, and
where
m is an integer from 45 to 150,
b independently at each occurrence for each $(C_bH_{2b}O)$ unit identically or differently is 2.3 or 4.

5. The polymer according to claim 3, wherein
U is oxygen,
p is 4,
X is oxygen,
k is 0, and
$R^1$, $R^2$, $R^5$ and $R^6$ independently of one another are hydrogen or a methyl group.

6. The polymer according to claim 1, wherein
n is an integer from 20 to 30,
a independently at each occurrence for each $(C_aH_{2a}O)$ unit identically or differently is 2 or 3.

7. The polymer according to claim 1, wherein
m is an integer from 65 to 75,
b independently at each occurrence for each $(C_bH_{2b}O)$ unit identically or differently is 2 or 3.

8. The polymer according to claim 1, wherein the ethylenically unsaturated monomer (I) is represented by at least one of the following general formulae from the group consisting of (I a), (I b), and (I c)

$$\begin{array}{c} R^7 \\ \diagdown \\ C=C \\ \diagup \quad \diagdown \\ B \qquad COOM_a \end{array} \quad (Ia)$$

$$\begin{array}{c} R^7 \qquad R^8 \\ \diagdown \\ C=C \\ \diagup \quad \diagdown \\ OC \qquad CO \\ \diagdown \quad \diagup \\ Z \end{array} \quad (Ib)$$

where
$R^7$ and $R^8$ independently of one another are hydrogen or an aliphatic hydrocarbon radical having 1 to 20 carbons,
B is H, $-COOM_a$, $-CO-O(C_qH_{2q}O)_r-R^9$, or $-CO-NH-(C_qH_{2q}O)_r-R^9$,
M is hydrogen, a mono-, di- or trivalent metal cation, ammonium ion or an organic amine radical,
a is ⅓, ½ or 1,
$R^9$ is hydrogen, an aliphatic hydrocarbon radical having 1 to 20 carbons, a cycloaliphatic hydrocarbon radical having 5 to 8 carbons, or an optionally substituted aryl radical having 6 to 14 carbons,
q independently at each occurrence for each $(C_qH_{2q}O)$ unit identically or differently is 2, 3 or 4, and
r is 0 to 200,
Z is O, $NR^{16}$,
$R^{16}$ independently at each occurrence is identical or different and represented by a branched or unbranched $C_1$ to $C_{10}$ alkyl radical, $C_5$ to $C_8$ cycloalkyl radical, aryl radical, heteroaryl radical or H, $$\begin{array}{c} R^{10} \qquad R^{11} \\ \diagdown \quad \diagup \\ C=C \\ O=C \qquad R^{13} \\ | \\ Q \\ | \\ R^{12} \end{array} \quad (Ic)$$

where $R^{10}$ and $R^{11}$ independently of one another are hydrogen or an aliphatic hydrocarbon radical having 1 to 20 carbons, a cycloaliphatic hydrocarbon radical having 5 to 8 carbons, or an optionally substituted aryl radical having 6 to 14 carbons, $R^{12}$ is identical or different and represented by $(C_nH_{2n})$—$SO_3H$ with n=0, 1, 2, 3 or 4, $(C_nH_{2n})$—OH with n=0, 1, 2, 3 or 4; $(C_nH_{2n})$—$PO_3H_2$ with n=0, 1, 2, 3 or 4, $(C_nH_{2n})$—$OPO_3H_2$ with n=0, 1, 2, 3 or 4, $(C_6H_4)$—$SO_3H$, $(C_6H_4)$—$PO_3H_2$, $(C_6H_4)$—$OPO_3H_2$ or $(C_nH_{2n})$—$NR^{14}{}_b$ with n=0, 1, 2, 3 or 4 and b=2 or 3, $R^{13}$ is H, —$COOM_a$, —CO—$O(C_qH_{2q}O)_r$—$R^9$, or —CO—NH—$(C_qH_{2q}O)_r$—$R^9$, where $M_a$, $R^9$, q, and r possess definitions stated above, $R^{14}$ is hydrogen, an aliphatic hydrocarbon radical having 1 to 10 carbons, a cycloaliphatic hydrocarbon radical having 5 to 8 carbons, or an optionally substituted aryl radical having 6 to 14 carbons, Q is identical or different and represented by NH, $NR^{15}$ or O;

where $R^{15}$ is an aliphatic hydrocarbon radical having 1 to 10 carbons, a cycloaliphatic hydrocarbon radical having 5 to 8 carbons or an optionally substituted aryl radical having 6 to 14 carbons.

9. The polymer according to claim 1, wherein the polymer is in powder form.

10. The polymer according to claim 1, wherein the ethylenically unsaturated monomer (I) is at least one compound from the group consisting of acrylic acid, methacrylic acid, crotonic acid, itaconic acid, maleic acid, fumaric acid, vinylsulfonic acid, allylsulfonic acid, sulfoethyl methacrylate, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, vinylphosphonic acid, allylphosphonic acid, N-(meth)acrylamidoalkylphosphonic acids, and (meth)acryloyloxyalkylphosphonic acids.

11. The polymer according to claim 1, wherein the fraction of the monomer (I) in the polymer is 50 to 90 mol %.

12. The polymer according to claim 1, wherein the fraction of the monomer (II) and the fraction of the monomer (III) together in the polymer are 10 to 50 mol %.

13. A process of utilizing the polymer according to claim 1 as an admixture for inorganic binder compositions comprising mixing the polymer in powder form with said inorganic binder compositions.

14. A composition in powder form, comprising, based on the total mass of the composition,
   A) at least 20 wt % of an inorganic binder and
   B) 0.01 to 4 wt % of at least one polymer according to claim 1.

15. The composition in powder form according to claim 14, which comprises self-leveling calcium sulfate screed.

16. The polymer according to claim 4, wherein
   U is oxygen,
   p is 4,
   X is oxygen,
   k is 0, and
   $R^1$, $R^2$, $R^5$ and $R^6$ independently of one another are hydrogen or a methyl group.

* * * * *

UNITED STATES PATENT AND TRADEMARK OFFICE
CERTIFICATE OF CORRECTION

PATENT NO. : 10,065,891 B2  
APPLICATION NO. : 15/524106  
DATED : September 4, 2018  
INVENTOR(S) : Bichler et al.

Page 1 of 1

It is certified that error appears in the above-identified patent and that said Letters Patent is hereby corrected as shown below:

In the Claims

Claim 3, Column 15, Line 2:
"...represented the..." should read --...represented by the...--

Claim 3, Column 15, Line 34:
"...is 2 3 or 4." should read --...is 2, 3 or 4.--

Claim 4, Column 15, Line 67:
"...is 2.3 or 4." should read --is 2, 3 or 4.--

Signed and Sealed this  
Twenty-eighth Day of May, 2019

Andrei Iancu  
*Director of the United States Patent and Trademark Office*